Feb. 11, 1936.  T. B. BRADLEY  2,030,349
BAKING PAN SUPPORTING RACK
Filed Oct. 21, 1933
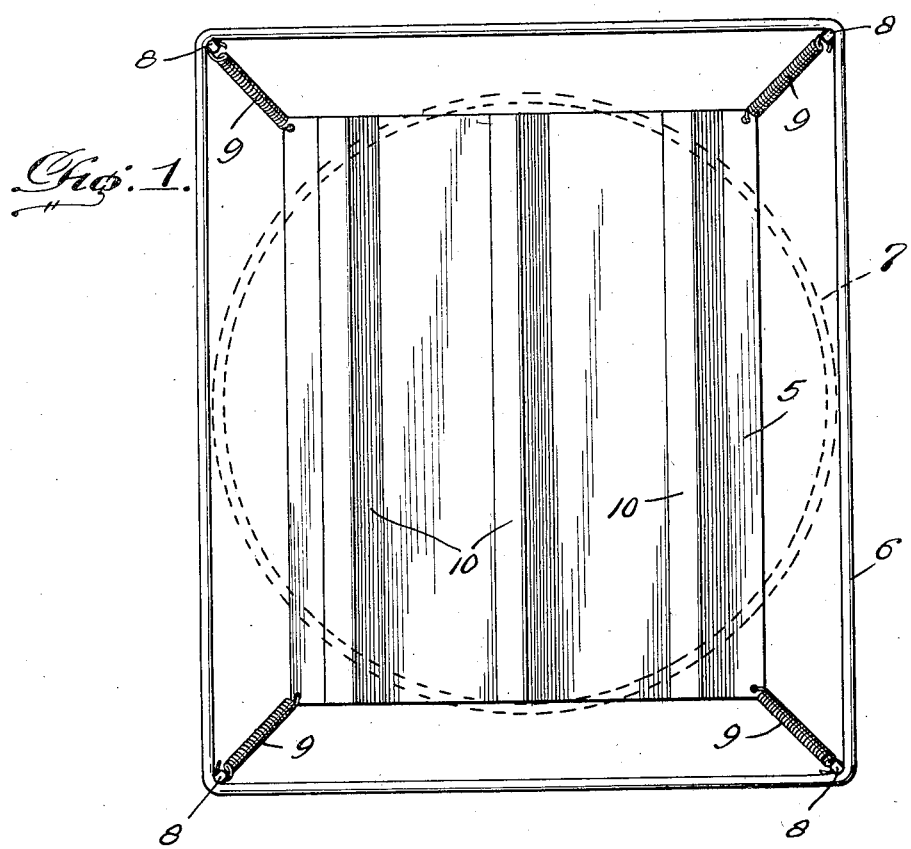
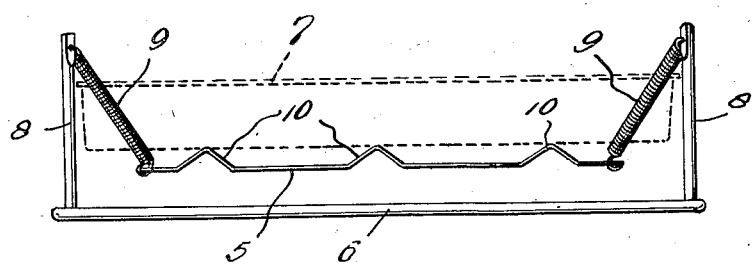
Thomas B. Bradley,
INVENTOR.
BY J. Stanley Burch
ATTORNEY.

Patented Feb. 11, 1936

2,030,349

UNITED STATES PATENT OFFICE 2,030,349

BAKING PAN SUPPORTING RACK

Thomas B. Bradley, Du Bois, Pa.

Application October 21, 1933, Serial No. 694,646

3 Claims. (Cl. 53—5)

This invention relates to an improved rack for supporting baking pans within the oven of a cooking stove, and the primary object of the invention is to provide a rack of this kind by means of which the baking pan is yieldingly supported to prevent undue transmission of shocks and vibration thereto during the baking process, such as frequently cause cakes to fall while in the process of baking.

A further object of the invention is to provide a supporting rack of the above kind including a yieldingly suspended protector plate upon which the baking pan is adapted to rest, said protector plate being constructed to provide for the circulation of heated air between the same and the bottom of the baking pan to minimize danger of burning the bottom of the cake during the baking process, even though the bottom of the pan may be quite thin and located in proximity to the greatest degree of heat within the oven.

A still further object of the present invention is to provide a supporting rack of the above kind which is extremely simple and durable in construction and highly efficient in use.

Other objects and features of the invention will become apparent from the following description when considered in connection with the accompanying drawing, in which:

Figure 1 is a top plan view of a supporting rack embodying the present invention; and Figure 2 is an elevational view thereof.

Referring more in detail to the drawing, the present invention generally consists of a protector plate 5 yieldingly carried by and horizontally sustained above the base 6 of a suitable support, the base 6 of the support being adapted to rest flatly upon the shelf or bottom of the oven of a cooking stove within which the device is placed, and the protector plate 5 being adapted to have the baking pan positioned thereon as indicated by dotted lines at 7. In this way, the baking pan is yieldingly supported in an elevated position within the oven so that any shocks or vibration imparted to the support will not be unduly transmitted to the protector plate 5 and the baking pan 7 positioned thereon. By preventing undue transmission of shocks and vibration to the baking pan, danger of falling of the cake being baked within said pan is minimized.

In the embodiment of the invention illustrated, the base 6 of the support is in the form of an open oblong frame of rigid construction and preferably formed of heavy gage wire. The support further includes a plurality of rigid uprights 8 rigid with and rising from the corners of the base 6, and from the upper ends of which the protector plate is yieldingly suspended by means of helical tension springs 9. It will be noted that the protector plate 5 is of an area slightly less than the area of the base 6 of the support and is suspended above and in centered relation to said base by the springs 9 which converge inwardly and downwardly where they attach at their lower ends to the corners of the protector plate 5. The protector plate 5 is thus yieldingly sustained in its elevated position so as to prevent undue transmission of shocks and vibration thereto in substantially all directions or both horizontally and vertically.

It will be noted that the protector plate 5 is provided with a plurality of spaced parallel upwardly directed corrugations 10 upon which the bottom of the baking pan 7 actually rests, so that the portions of the bottom wall of the baking pan between the corrugations 10 are spaced from the corresponding portions of the protector plate 5. This permits the circulation of hot air between the protector plate and the bottom of the baking pan so as to prevent burning of the bottom of the cake even though the bottom of the baking pan may be thin and located in proximity to the greatest degree of heat within the oven. The base 6 of the support and the protector plate 5 are preferably of elongated or oblong form so that the device may be well adapted for use in connection with pans of different sizes and shapes. More particularly, this form provides for positioning of the device with a broad side thereof toward the front of the oven when using relatively wide baking pans, and use of the device with one of the narrower sides thereof toward the front of the oven when using narrower baking pans.

From the foregoing description, it will be seen that I have provided a very simple and durable baking pan support of the character described which may be economically manufactured, and which will efficiently accomplish the stated objects of the invention. Minor changes in the details of construction specifically illustrated and described are contemplated within the spirit and scope of the invention as claimed.

What I claim as new is:

1. A supporting rack for baking pans including a support of a size to be received in the oven of a cooking stove and adapted to rest upon the bottom or shelf of the oven, a pan sustaining member, and yieldable means mounting said pan sustaining member on said support, said mounting means being so highly and freely yieldable as to prevent undue transmission of shocks and vibrations from said support to said pan sustaining member.

2. A baking pan support comprising a support of a size to be received in the oven of a cooking stove, said support consisting of an open rectangular base adapted to rest upon the bottom or shelf of the oven and uprights rigid with and rising from the corners of said base, a rectangular pan rest plate, and elastic means connected to the corners of said pan rest plate and yieldingly suspending said pan rest from said uprights, said elastic means being so highly and freely yieldable as to prevent undue transmission of shocks and vibrations from said support to said pan rest.

3. A baking pan support comprising a support of a size to be received in the oven of a cooking stove, said support consisting of an open rectangular base adapted to rest upon the bottom or shelf of the oven and uprights rigid with and rising from said base, a pan rest, and elastic means yieldingly suspending said pan rest from said uprights, said elastic means being so highly and freely yieldable as to prevent undue transmission of shocks and vibrations from said support to said pan rest, said pan rest comprising a horizontal protector plate provided with upstanding ribs formed and arranged to provide open spaces between the bottom of the pan and the major portion of said plate through which hot air may freely circulate.

THOMAS B. BRADLEY.